July 24, 1962
E. C. HANDWERK
3,045,995
HEATED FRACTIONATING COLUMN
Filed Sept. 26, 1957
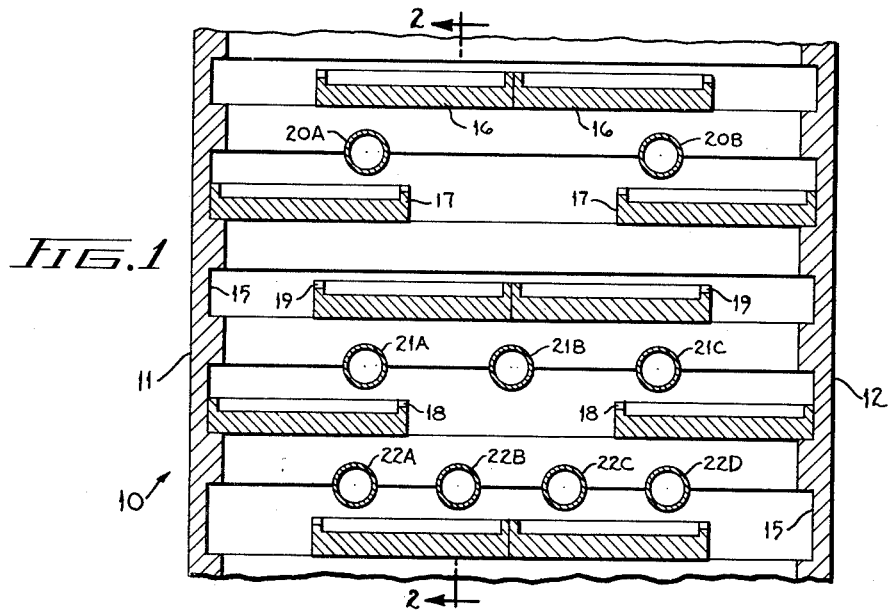
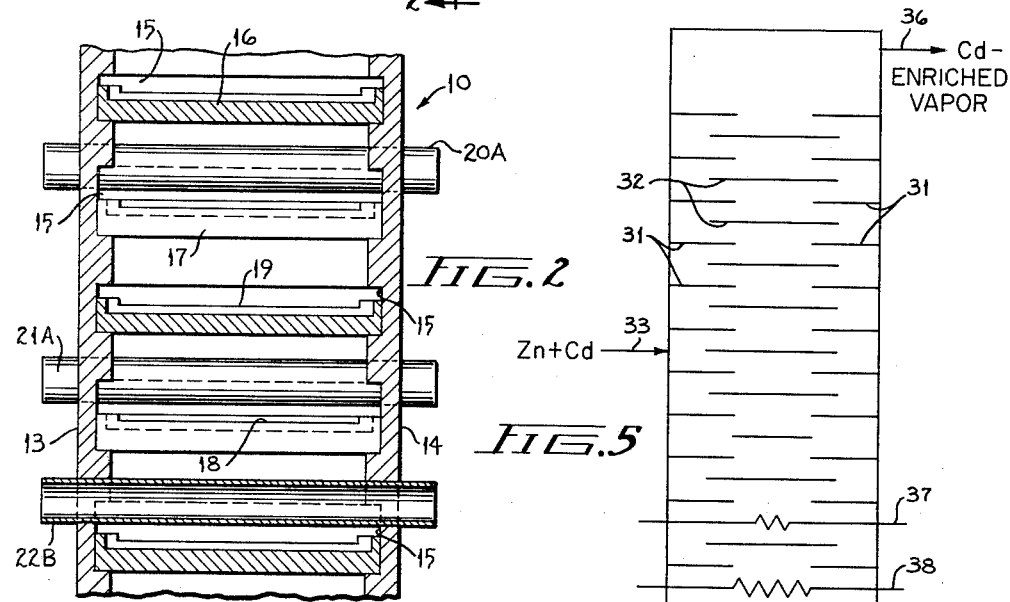
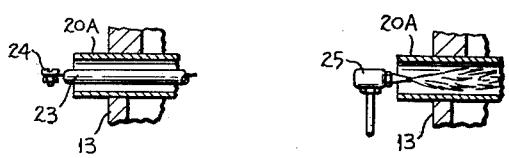
INVENTOR.
ERWIN C. HANDWERK United States Patent Office 3,045,995
Patented July 24, 1962

3,045,995
HEATED FRACTIONATING COLUMN
Erwin C. Handwerk, Lehighton, Pa., assignor to American Metal Climax, Inc., a corporation of New York
Filed Sept. 26, 1957, Ser. No. 686,317
3 Claims. (Cl. 266—19)

This invention relates to the purification of metallic vapors and more particularly to apparatus adapted for the fractional distillation of zinc to effect its separation from contaminants such as iron, lead and cadmium.

In 1935 fourteen U.S. patents, Nos. 1,994,345 to 1,994,358, inclusive, were granted for zinc distillation and apparatus therefor. While the production of refined zinc based on fractional distillation has spread worldwide and increased substantially in tonnage over the years, the technology of refining metallic zinc by fractional distillation has remained essentially unchanged.

The conventional practice has been to form the zinc distillation column by stacking a multiplicity of trays, each having side walls for the dual purpose of confining a pool of molten metal on the tray and of supporting the stacked trays in spaced relationship to one another. This type of structure is shown in the 1935 patents, e.g., FIGURES 1 and 2 of U.S. Patent 1,994,349; when it is remembered that each tray is made of a refractory material, it will be readily appreciated that the trays in the lower portion of the column are particularly subject to cracking and like mechanical failures because of the substantial superimposed load and because of thermal strains caused by fluctuations or changes in operating conditions which may even result in completely boiling away the liquid on the trays, referred to as "dry" boiling. These difficulties are aggravated when, as shown in FIGURE 3 of U.S. Patent 1,994,349, the stacked trays forming the lower portion of the column are disposed within a combustion chamber. In such case, heat required for the vaporization of molten zinc on these trays must flow through the side walls thereof and yet these side walls must carry the heavy load of superimposed trays containing molten metal. Obviously, each failure is costly because of not only the long shut-down time required to cool and reheat the column but also the considerable labor necessary to rebuild practically the entire column to replace a damaged tray in the lower portion thereof.

The foregoing difficulties are avoided by the improved fractionating column disclosed in my copending application Serial No. 638,849, filed February 7, 1957, now U.S. Patent No. 2,983,494 of which this application is a continuation in part. The fractionating column of the aforesaid application has trays which are individually supported by horizontal grooves or slots in the inner sides of the column walls. Edge portions of each tray fit loosely in horizontal wall grooves to provide individual support of the tray by the column walls. Thus, the trays no longer have a load-bearing function and are free to expand and contract with temperature changes because they are loosely positioned in the supporting wall grooves.

It has now been found that the refining of zinc by fractional distillation is improved by introducing varying amounts of heat along the height of the lower portion of the distillation column to maintain an increasing temperature gradient in the direction of molten metal flow.

Accordingly, a principal object of this invention is to provide a fractionating column for metallic vapors, which is structurally simple and durable as disclosed in the aforesaid application, with heating means disposed to ensure the maintenance of a temperature gradient along the height of the lower portion of the column.

Other objects and advantages of the invention will be apparent from the description which follows.

In accordance with this invention, a fractionating column for metallic vapors comprises four substantially vertical walls disposed to form a column having a substantially rectangular horizontal cross-section, a multiplicity of substantially rectangular trays individually supported by the walls of the column, and at least two heating means disposed at vertically spaced levels with at least one tray disposed at an intervening level in the lower portion of the column for the introduction of varying quantities of heat at the respective levels. Each heating means positioned below another heating means has a heating capacity greater than that of the heating means positioned at the next higher level. Additionally, the fractionating column is provided with a boiler or retort to generate the metallic vapor which flows from the bottom to the top of the column.

As shown in U.S. Patent 1,994,349, the boiler may be separate from, but connected by a vapor conduit to, the fractionating column (FIGURES 1 and 7) or it may be integral with the column (FIGURES 3 and 4). In short, the heating means positioned at vertically spaced levels in the lower portion of the column supplement the usual boiler in its function of vaporizing molten metal and provide a vernier control for the maintenance of an increasing temperature gradient in the molten condensed metal as it flows downwardly in the lower portion of the column.

For a fuller understanding of the invention, reference is now made to the accompanying drawings wherein:

FIGURE 1 is a vertical section of the lower portion of a fractionating column formed of refractory materials, and provided with heating means for introducing varying quantities of heat at three vertically spaced levels therein;

FIGURE 2 is a vertical section of the same portion of the fractionating column taken through line 2—2 of FIGURE 1;

FIGURE 3 is a fragmentary vertical section of an electrical-type heating element which may be used as the heating means in the lower portion of the fractionating column shown in FIGURES 1 and 2;

FIGURE 4 is a fragmentary vertical section of a combustion-type heating element which may be alternatively used as the heating means in the lower portion of the fractionating column shown in FIGURES 1 and 2; and FIGURE 5 is a diagrammatic elevation of a fractionating column embodying the heating means of this invention and useful for refining cadmium-containing zinc.

The lower portion of the fractionating column shown in FIGURES 1 and 2 comprises a tower 10 formed by two pairs of substantially parallel walls 11, 12 and 13, 14 arranged to provide a tower opening having a rectangular horizontal cross-section. The inner sides of walls 11, 12, 13, 14 are provided with vertically spaced horizontal grooves 15. A plurality of vertically spaced trays have edge portions fitted loosely in horizontal grooves 15 which provide the sole support for these trays.

FIGURE 1 shows that the tray at each level in the fractionating column consists of a pair of similar tray elements 16 or 17 of rectangular shape. Each pair of tray elements 16 disposed in the horizontal grooves 15 at one level in tower 10 abut one another along the vertical center line of tower 10, whereas the pair of tray elements 17 in each of the grooves 15 at the next lower and next higher levels in tower 10 are laterally spaced from one another and one edge portion of each tray element 17 which is parallel to the opening between the spaced elements 17 fits loosely in a horizontal groove 15. In short, pairs of tray elements 16 and 17 are alternately disposed at adjacent levels in tower 10 so that hot vapors ascending through tower 10 pass through the space between each pair of tray elements 17 and flow around each pair of tray elements 16. While the hot vapors are flowing in this zigzag pattern, liquid condensed therefrom flows along each tray element 17 toward the edge which is not fitted into a horizontal groove 15, and spills over weir 18 onto the subjacent tray element 16. In turn, liquid flows from each tray element 16 to its weir 19 where it again overflows dropping to the subjacent tray element 17. It will be noted that tray elements 16 are supported in horizontal grooves 15 by only one pair of opposite edge portions, whereas tray elements 17 have three edge portions fitted loosely in horizontal grooves 15. Because two tray elements 16 are used rather than one large tray, liquid falling on these tray elements 16 will flow more positively to both of the two weirs 19 disposed on opposite sides of these elements 16.

Not only do horizontal grooves 15 provide the sole support for all of the trays in the fractionating column, but also these grooves promote the flow of liquid condensed on walls 11, 12, 13, 14 onto tray elements 16, 17. That is to say, hot vapors condensed on walls 11, 12, 13, 14, will not tend to flow down the full length of these walls but rather will tend to drip off these walls promptly after being condensed along the upper side of horizontal grooves 15. The drops of condensed liquid fall on tray elements 16, 17 and join the liquid flowing as a shallow pool across the upper faces thereof to maintain good fractionating contact with the hot vapors. The edge portions along three sides of the rectangular shape of each tray element 16, 17 is thicker than the major portion of such tray element and a weir 18 or 19 is provided along the fourth side of each tray element 17 or 16, respectively. The thicker edge portions of each tray element 16, 17 not only promote the flow of condensed liquid away from walls 11, 12, 13, 14 so as to bring this liquid in good fractionating contact with the hot vapors, but also the thicker edge portions provide maximum strength in tray elements 16, 17 at the support points.

The bottom end (not shown) of the fractionating column of FIGURES 1 and 2 may, as previously mentioned in connection with U.S. Patent 1,994,349, be either connected to a separate boiler or integral therewith. In any event, the boiler is the means for volatilizing the molten metal at the bottom end of the column. Pursuant to this invention, while the metallic vapor ascending from the boiler flows over and in contact with shallow pools of molten metal condensed from the metallic vapor and collected on trays in the column, increasing quantities of heat are introduced at spaced levels in the lower portion of the column as the levels are closer and closer to the lowermost tray of the column. Heating means 20 comprises two radiation refractory tubes 20A and 20B extending horizontally through column 10 for the purpose of supplying heat at one level therein, heating means 21 comprises three like tubes 21A, 21B and 21C similarly disposed at a lower level for supplying more heat than is supplied by tubes 20A and 20B, and heating means 22 comprises four like tubes 22A, 22B, 22C and 22D similarly disposed at a still lower level for supplying more heat than is supplied by tubes 21A, 21B and 21C.

Heat energy introduced into tower 10 by way of the radiation tubes may be derived from any convenient source. Thus, FIGURE 3 shows tube 20A provided with an electrical resistance heater 23, such as the well-known Globar, to which electricity is furnished by wires (not shown) connected to the opposite ends of heater 23 by bolts 24. Alternatively, FIGURE 4 illustrates tube 20A equipped with a gas burner 25 which injects a flame into one end of tube 20A, the resulting combustion gases venting from the opposite end.

The fractionating column of this invention is predicated on the use of refractory materials necessitated by the high temperatures at which the column will be operated and/or by the corrosive, erosive or like action of the vapors and liquid flowing through the column. Suitable refractory materials for exposure to zinc vapors and molten metal include graphite, high grade firebrick and silicon carbide. With the best refractory materials now available, it is advisable to make the maximum dimension of tray elements not more than about 3 feet and the dimension at right angles thereto not more than about 2 feet.

In view of the fact that the joints between blocks or bricks of the refractory materials used in the erection of the tower walls are prone to leak even at moderate pressures, it is highly desirable to minimize the pressure drop or differential along the vertical dimension of the fractionating column. For this reason, it is advisable to dimension the tray at each level in the column so that it occupies from about 50% to about 80% of the opening bounded by the tower walls.

FIGURE 5 diagrammatically shows a sectional elevation of a fractionating column or tower 30 useful for the separation of cadmium from zinc provided with a multiplicity of trays 31 disposed in spaced, alternating relation with a multiplicity of trays 32. A conduit 33 discharges zinc and cadmium, in either vapor or liquid form or a combination of both forms, at an intermediate level of tower 30. Molten refined zinc containing at most a trace of cadmium collects in bottom 34 of tower 30 and is withdrawn therefrom by way of conduit 35. The metallic vapor rising through column 30 becomes progressively enriched in cadmium content and finally leaves the top of column 30 through conduit 36. The top portion of column 30, particularly the portion above the uppermost tray is designed to dissipate heat in order to promote the condensation of the metallic vapor and thus provide liquid reflux in column 30. The dissipation of heat from the top of column 30 may be achieved by applying very little or no insulation to the roof and walls at the top of column 30. The condensed metal cascading through the series of trays 31 and 32 is progressively depleted of cadmium content and this stripping of cadmium from the molten zinc flowing down through the lower portion of tower 30 is materially enhanced by the two heating means 37 and 38 disposed at spaced levels in the lower portion of column 30 with intervening trays. The heating capacity of heating means 38 is greater than that of heating means 37 so that the molten metal descending through tower 30 is subjected to an increasing temperature gradient. Heating means 39 which may be of a similar type to heating means 37 and 38 are disposed over the pool of molten zinc at bottom 34 of tower 30. Thus, the bottom portion of tower 30 provides a zinc boiler which is an integral part of tower 30. While heating means 37, 38 and 39 are represented in FIGURE 5 as being of the electrical resistance type, combustion tubes may be substituted therefor. It will be appreciated that the walls of tower 30 are well insulated except along the portions contiguous to the roof of column 30 to avoid the loss of heat and thus facilitate the maintenance of the desired increasing temperature gradient in the descending molten metal. While only two heating means 37 and 38 are shown at spaced levels in the lower portion of tower 30 above heating means 39 of the zinc boiler, it is obvious that additional heating means may be used in the lower portion of tower 30 to facilitate the maintenance of the desired increasing temperature gradient in the molten metal flowing downwardly through tower 30.

In lieu of electrical resistance heaters, individually supported with the outer surface thereof spaced from the inner surface of a radiation refractory tube as shown in FIGURE 3, the heating means used at each level in the lower portion of the fractionating column pursuant to this invention may be a resistor grid of the type shown in U.S. Patent 2,472,613. Such heating grid is exposed to the metallic vapor in the column and is formed of a plurality of elongated bars of refractory electric conductive material such as graphite, disposed in spaced side by side relation and connected to one another in series.

When radiation refractory tubes are used, it is preferable, as shown in FIGURE 1, to position them in the tower so that they are substantially parallel to the weirs of the trays and away from the vertical paths of the descending liquid spilling over the weirs. In short, the life of the radiation tubes is extended by preventing direct spillage of molten metal from the trays onto the radiation tubes.

Each of the vertically spaced heating means of this invention should be positioned above at least one tray above the next lower heating means and the lowermost heating means should be above at least the two lowermost trays of the fractionating column.

Pursuant to this invention, heat is introduced independently at two or more vertically spaced levels in the lower portion of the fractionating column in addition to the heat entering the bottom of the column with the metallic vapor generated in the boiler. The heating means at each of these vertically spaced levels is desirably of a heating capacity greater than that normally required to maintain the desired temperature gradient in the lower portion of the column. This arrangement is particularly advantageous where, as shown in FIGURE 1, the heating means at each of the vertically spaced levels comprises a plurality of radiation tubes. In the long continued operation of such a fractionating column when one of these radiation tubes cracks or otherwise fails, it may be readily sealed off and the column may remain in operation by increasing the heat input through the remaining radiation tubes on that same level. Alternatively, more radiation tubes may be built at each level in the column than are required in the normal operation of the column and some will be sealed off until required when one or more of those in service has failed. Then, the radiation tube which has failed is sealed off and one of the spare sealed radiation tubes is brought into operation to take over the heat input duty of the radiation tube which has failed. In this manner, again, the fractionating column may be operated without interruption in spite of the occasional failure of a radiation tube.

An important feature of this invention is the independent control of temperature in the lower portion of the fractionating column provided by the heating means at each of the vertically spaced levels therein. Where the heating means at one of the vertically spaced levels comprises a plurality of separate radiation tubes, as shown in FIGURE 1, there is the additional advantage of great flexibility of operation and temperature control resulting from the fact that the heat input by way of each of the refractory tubes can be individually controlled. In contrast thereto, when the heating means at one of the vertically spaced levels in the lower portion of the fractionating column is a resistor grid of the type shown in U.S. Patent 2,472,613, a break in any one of the elongated conductive bars of the grid destroys the heating function of the entire resistor grid.

In a specific example of the fractionating column of FIGURES 1 and 2, each radiation tube is a Carbofrax refractory tube having inside and outside diameters of 4 and 5¾ inches, respectively. An elongated resistance heater having a diameter of 1¾ inches is centered in and extends through each radiation tube. Each resistance heater has a heating capacity of 50 watts per square inch of its outer surface.

While the invention has been described in connection with the refining of zinc contaminated with an impurity having a lower boiling point than that of zinc, namely, cadmium, it is also applicable to the refining of zinc containing impurities having higher boiling points than that of zinc, such as lead, copper and iron. Thus, molten zinc containing lead is introduced into the boiler of a fractionating column and heated to effect volatilization of zinc. The zinc vapor containing a minute quantity of lead because of entrainment and slight volatilization of lead passes up through the fractionating column in contact with liquid condensed therefrom. Because of the vapor-liquid contact in the column, substantially pure zinc vapor is withdrawn from the top of the column while the lead removed from the vapor is returned by the descending liquid to the boiler.

Various modifications within the spirit and scope of the invention will be apparent upon consideration of the foregoing disclosure. Accordingly, only such limitations should be imposed on the invention as are set forth in the appended claims.

What is claimed is:

1. An improved fractionating column formed of refractory materials, wherein ascending hot metallic vapors are contacted with descending liquid metal condensed from said vapors and flowing on vertically spaced trays in said column, which comprises two pairs of substantially parallel walls arranged to provide a tower with an opening having a rectangular horizontal cross-section, vertically spaced horizontal grooves in the inner sides of at least one pair of said walls, a rectangular tray with one pair of opposite edge portions fitted loosely in said grooves at each vertically spaced level in said tower, a weir along one vertical retaining edge portion of each said tray at right angles to said pair of edge portions fitted loosely in said grooves, lower heating means disposed in said tower above at least the two lowermost of said trays, and upper heating means disposed in said tower above at least one of said trays above said lower heating means, said lower and upper heating means being adapted to maintain an increasing temperature gradient in said descending liquid metal in the lower portion of said tower, each of said lower and upper heating means being a plurality of radiation refractory tubes extending substantially horizontally and straight through said tower and one pair of parallel walls thereof, and said radiation refractory tubes having an exteriorly convex form from end to end and being positioned substantially parallel to said weirs of said trays and away from the vertical paths of said descending liquid metal spilling over said weirs.

2. The fractionating column of claim 1 wherein an elongated electrical resistance heater is disposed in each radiation refractory tube with its outer surface spaced from the inner surface of said radiation refractory tube.

3. The factionating column of claim 1 wherein said tubes of said lower heating means are greater in number than said tubes of said upper heating means.

References Cited in the file of this patent

UNITED STATES PATENTS

| | | |
|---|---|---|
| 591,138 | Mixer | Oct. 5, 1897 |
| 862,314 | Decker | Aug. 6, 1907 |
| 1,276,690 | Pyzel | Aug. 20, 1918 |
| 1,942,767 | Oman et al. | Jan. 9, 1934 |
| 1,968,093 | Otto et al. | July 31, 1934 |
| 1,987,097 | Coubrough | Jan. 8, 1935 |
| 1,994,349 | Ginder et al. | Mar. 12, 1935 |
| 1,994,357 | Ginder et al. | Mar. 12, 1935 |
| 2,048,863 | Handwerk et al. | July 28, 1936 |
| 2,267,698 | Janes | Dec. 23, 1941 |
| 2,475,481 | Clemens | July 5, 1949 |
| 2,670,196 | Breyer et al. | Feb. 23, 1954 |
| 2,694,675 | Hogan | Nov. 16, 1954 |
| 2,715,607 | Lee | Aug. 16, 1955 |
| 2,983,493 | Handwerk | May 9, 1961 |
| 2,983,494 | Handwerk | May 9, 1961 |